United States Patent [19]
Evans et al.

[11] 4,044,191
[45] Aug. 23, 1977

[54] ELECTRIC CELLS

[75] Inventors: Leslie Samuel Evans, Reading; Roger John Bones, Abingdon; John Richard Harbar, Wantage, all of England

[73] Assignee: The Secretary of State for Industry in Her Britannic Majesty's Government of the United Kingdom of Great Britain and Northern Ireland, England

[21] Appl. No.: 632,784

[22] Filed: Nov. 17, 1975

[30] Foreign Application Priority Data

Dec. 24, 1974 United Kingdom ............... 55767/74

[51] Int. Cl.² ............................................. H01M 4/36
[52] U.S. Cl. ................................................... 429/104
[58] Field of Search ............ 136/6 FS, 6 F, 20, 83 R, 136/100 R; 429/101–104, 218

[56] References Cited

U.S. PATENT DOCUMENTS

| 3,811,943 | 5/1974 | Minch et al. | 136/83 R X |
| 3,922,176 | 11/1975 | Robinson | 136/6 FS |
| 3,932,195 | 1/1976 | Evans et al. | 136/6 FS |

Primary Examiner—C. F. Lefevour
Attorney, Agent, or Firm—Larson, Taylor and Hinds

[57] ABSTRACT

In an electric cell having a solid electrolyte which bounds on one side a compartment for liquid anode and on its opposite side a compartment for liquid cathode, the liquid anode compartment is made of very limited capacity. The bulk of the liquid anode required by the cell is held in a reservoir and fed to the liquid anode compartment by a capillary duct to provide a restricted feed which limits the flow of liquid anode therebetween. The reservoir may be disposed within the cell, or outside the cell, and may supply liquid anode to several cells.

8 Claims, 6 Drawing Figures

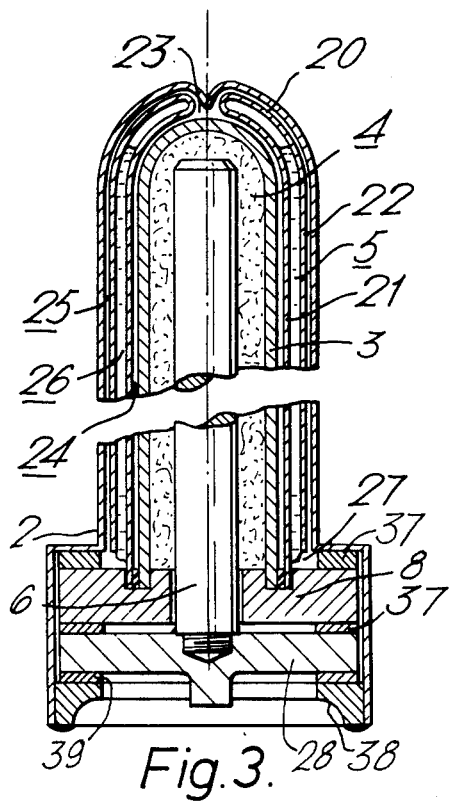
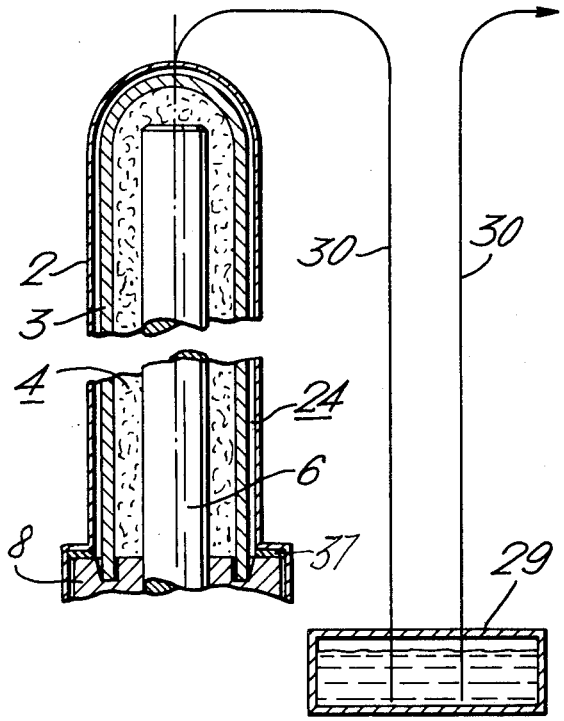
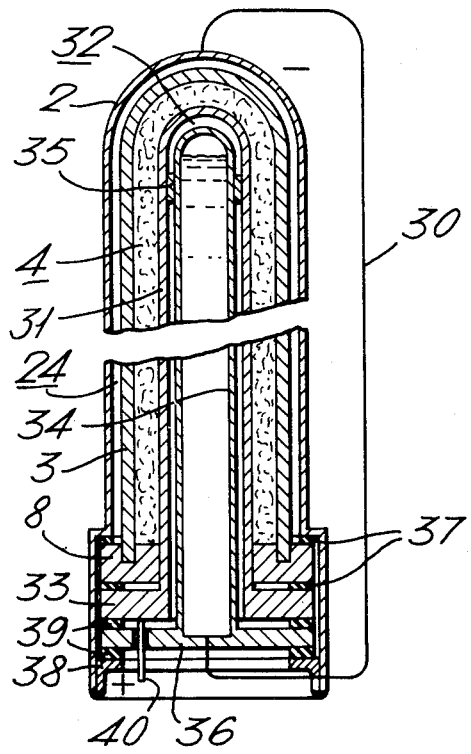

ELECTRIC CELLS

BACKGROUND OF THE INVENTION

This invention relates to electric cells employing a liquid anode, a liquid cathode and a solid electrolyte, and in particular to electric cells having a solid electrolyte which partially bounds on one side a compartment for liquid anode and on the opposite side a compartment for liquid cathode, an example of such a cell being shown in co-pending patent application Ser. No. 556,500.

A potential hazard associated with such electric cells is that resulting from uncontrolled mixing of the liquid anode and the liquid cathode in the event of damage to the solid electrolyte which normally separates them in the cell. For example, when liquid sodium is allowed to run freely into liquid sulphur, a very rapid reaction occurs with the formation of highly corrosive sodium polysulphides, and much heat is evolved which in an electric cell could lead to rapid corrosion and melting of metallic components, to a fire, and even to an explosion.

It is therefore an object of the present invention to reduce the likelihood of such a hazardous situation occurring in the event of damage to the solid electrolyte in the aforesaid cells.

SUMMARY OF THE INVENTION

According to the present invention, in an electric cell having a solid electrolyte which partially bounds on one side a compartment for a liquid anode and on the opposite side a compartment for a liquid cathode, the compartment for liquid anode is made of very limited capacity so as to contain only a very limited proportion of the liquid anode required by the cell and is shaped so that it generally follows the contour of the solid electrolyte to present a shallow space for liquid anode normal to the surface of the solid electrolyte, a reservoir is provided in which the bulk of the anode liquid is arranged to be stored, a duct is connected between the liquid anode compartment and the reservoir for a restricted feed of liquid anode therethrough, said duct being adapted to meet that amount of liquid anode required during normal discharge of the cell but to limit higher rates of feed of liquid anode, and barrier means separate the liquid anode compartment and the reservoir adapted to prevent liquid sulphur which might leak into the liquid anode compartment in the event of damage to the solid electrolyte from reaching the reservoir.

The barrier means may be a structural member resistant to the corrosive attack of hot sodium polysulphides, or may be a space between a cell having an external reservoir.

Porous foam material may be disposed in the reservoir.

BRIEF EXPLANATION OF THE DRAWINGS

To enable the present invention to be more readily understood, several electric cells in accordance with the invention employing liquid sodium as the liquid anode and liquid sulphur as the cathode will now be described by way of example only and with reference to the accompanying drawings in which:

FIG. 1 shows in median section an electric cell of tubular form;

FIG. 2 shows in part-section an electric cell similar to that shown in FIG. 1 but having an external reservoir for liquid sodium;

FIG. 3 shows an electric cell of tubular form and having a hollow current collector which provides an electrically insulated reservoir for liquid sodium;

In the above mentioned figures, like parts have like numerals.

DETAILED DESCRIPTION OF THE INVENTION

Figure 4:
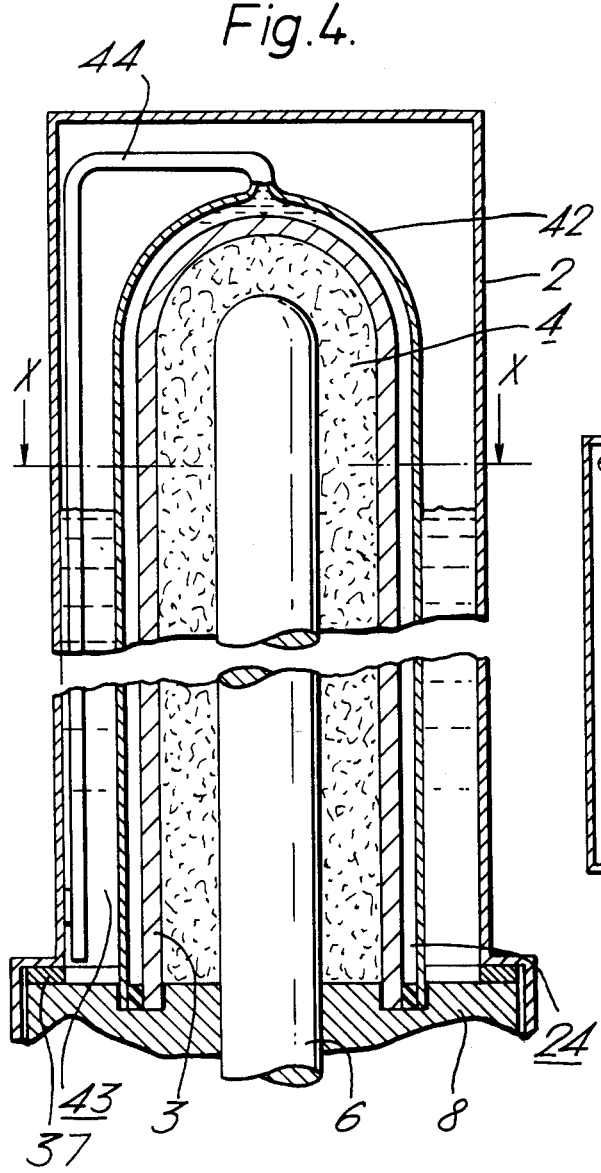
FIG. 4 shows in part-section an electric cell having a square casing and round tubular solid electrolyte.

Referring now to FIG. 1, the electric cell comprises a stainless steel casing 2, a solid electrolyte 3 of betaalumina ceramic and of tubular form disposed lengthwise within the casing 2 so as to define an inner compartment 4 for sulphur and an outer space 5 for sodium which bounds the inner compartment 4, and a carbon rod 6 disposed in the inner compartment 4 so as to serve as means for collecting current generated by electro-chemical reaction between the sulphur and the sodium.

The casing 2 and the solid electrolyte 3 are of blindended tubular form. Sulphur impregnated in a graphite felt is disposed between the carbon rod 6 and the inner surface of the solid electrolyte 3.

A shaped hollow cylindrical molybdenum tube 20, having a wall developed to define an inner cylindrical wall 21 and an outer cylindrical wall 22 and joined at one end to define a shaped hole 23, is disposed in the outer space 5 to define a liquid anode compartment in the form of an inner annular gap 24, an outer annular wicking gap 25, and a reservoir 26 for storage of liquid sodium. The radial dimension of the inner gap 24 relative to that of the outer surface of the solid electrolyte 3 is such as to define a space to store the minimum amount of sodium needed to keep the outer surface of the solid electrolyte 3 "wetted" and to allow for irregularities in the surface of the solid electrolyte, a radial gap of the order of 1½mm and not exceeding 2mm is advised. The radial dimensions of the wicking gap 25 of between 0.1mm to 0.5mm, are such as to provide a capillary action on the liquid sodium contained therein and cause the liquid sodium to flow into the top of the inner gap 24. The blind end of the casing 2 is dimpled to provide an extension of the wicking gap 25 leading to the inner gap 24. The inner wall 21 and the solid electrolyte 3 are joined by glass seals to an alpha-alumina annular shaped end cap 8, and the inner wall 21 is made longer than the outer wall 22 so as to leave an annular aperture 27 between the edge of the outer wall 22 and the end cap 8 for entry of liquid sodium into the wicking gap 25.

The carbon rod 6 has a threaded end which locates in a stainless steel end disc 28, and the cell is closed using "Grafoil" seals 37, a stainless steel end cap 38 welded to the casing 2, and alpha-alumina insulating spacer 39 between the end cap 38 and end disc 28. The casing 2 provides the negative terminal an the end disc 28 the positive terminal.

In operation during discharge of the cell, liquid sodium stored in the reservoir 26 is drawn through the aperture 27, by the capillary action of the wicking gap 25, and into the inner gap 24. In the event of damage to the solid electrolyte 3, only a limited amount of liquid sodium is readily available in the inner gap 24 to mix with the liquid sulphur and further supply of liquid sodium is limited by the restricted feed of the wicking gap 25. Any liquid sulphur leaking into the inner gap 24 is prevented by the barrier means in the form of the inner wall 21 from reaching the bulk of the liquid sodium in the reservoir 26, the inner wall 21 being resistant to the corrosive attack of hot sodium polysulphides which might be formed in or leak into the inner gap 24.

Referring now to FIG. 2, liquid sodium is supplied to the electric cell from an external reservoir 29 by means of a stainless steel capillary tube 30. The annular gap 24 between the stainless steel casing 2 and the solid electrolyte 3 fulfils the same function as the inner gap 24 of FIG. 1, and the space between the gap 24 and the reservoir 29 fulfils the function of a barrier means of preventing liquid sulphur from reaching the reservoir 29.

In operation, the reservoir 29 would need to be heated by means (not shown) to liquify the sodium contained therein, and the capillary tube 30 should be surrounded by thermal insulation (not shown). As an alternative to relying on the capillary action of the tube 30 to feed liquid sodium to the cell, the reservoir 29 could be disposed above the cell and liquid sodium supplied to the cell by gravity feed but using a capillary tube to limit the rate at which the sodium was supplied. A plurality of electric cells may be supplied with liquid sodium from a single reservoir 29, and several capillary tubes may be used to feed liquid sodium to a cell if a rate of feed higher than that provided by one capillary tube is required.

In the arrangement shown in FIG. 3, a reservoir for liquid sodium is provided inside a stainless steel tube 34 disposed in the space 32 inside a hollow graphite current collector 6 which is closed at its far end in the cell and flanged at its other end 33, the tube 34 being provided with alpha-alumina spacers 35 to insulate it from the current collector 6. The corrosion resistant current collector 6 also provides a barrier means between the reservoir in the tube 34 and the liquid sulphur compartment 4. The tube 34 is provided with a flange 36 to retain it lengthwise relative to the current collector 6. The cell is closed using "Grafoil" seals 37, a stainless steel end cap 38 welded to the casing 2, and alpha-alumina insulating spacers 39 disposed each side of the flange 36. A rod 40 extending from the flanged end 33 through the flange 36 and electrically insulated from flange 36 provides the positive terminal, the negative terminal being provided by the casing 2.

In operation, liquid sodium is drawn from the tube 34 and fed to the annular gap 24 by a capillary tube 30.

As an alternative to providing a tube 34 for containing the liquid sodium, the inside surface of the current collector 6 may be provided with an insulating layer (not shown) of alpha-alumina for example, so that all the space 32 can be used as a reservoir for liquid sodium. To minimise any risk of accidental damage to the capillary tube 30, in an alternative arrangement the capillary tube 30 may follow a shortened path within the electric cell from the tube 34 to the annular gap 24, the alpha-alumina end cap 8, the flanged end 33, and the flange 36 being adapted to provide a space for the capillary tube 30 to pass through them.

Figure 4A:
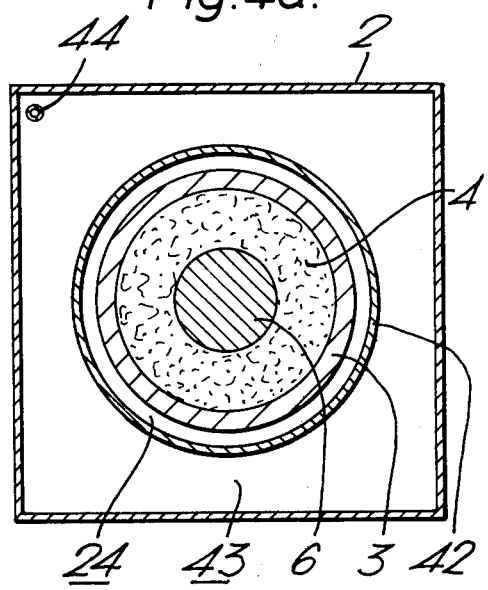
FIG. 4a shows a sectional view about the line X-X In FIG. 4.

The invention is not limited to cells of circular form in section, and in FIG. 4 part of an electric cell having a stainless steel casing 2 of square form in section is shown, a section about the line X—X in FIG. 4 being shown in FIG. 4a. The round tubular beta-alumina solid electrolyte 3 is bounded by round tubular molybdenum inner casing 42, which defines an annular gap 24, similar in function to the gap 24 in FIG. 1, and an outer reservoir space 43 for liquid sodium. Liquid sodium is fed to the top of the gap 24 from the reservoir space 43 by means of a molybdenum capillary tube 44 fastened to the inside of the casing 2 in one of the corners of the reservoir space 43. A plurality of capillary tubes 44 may be disposed in the reservoir 43, a convenient arrangement being to dispose a tube 44 in each of the longitudinal corners of the reservoir 43. Other tubes 44 may be disposed elsewhere in the reservoir 43 to increase the rate of flow of liquid sodium into the gap 24 if required.

Figure 5:
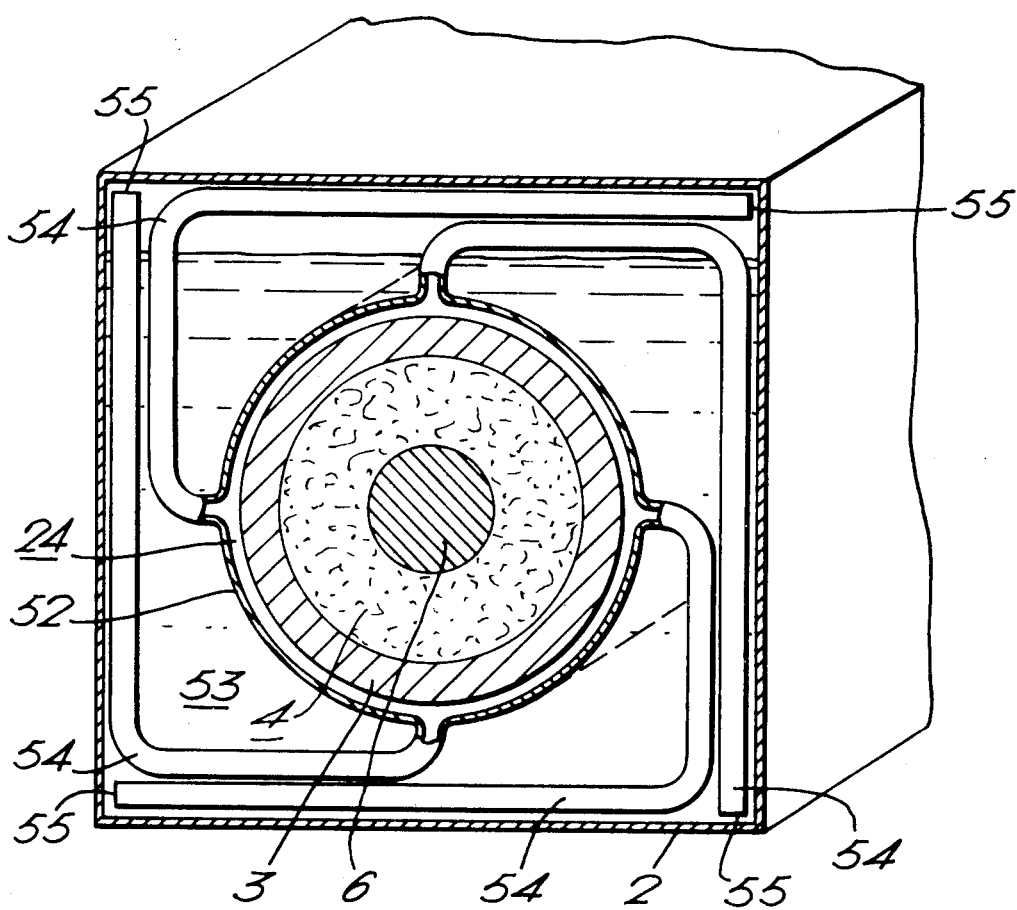
FIG. 5 shows an isometric sectional view of part of an electric cell having a square casing and for use with its longitudinal axis horizontal.

Although the various examples shown have been described in relation to electric cells having their longitudinal axis vertical, the invention may be adapted to suit cells having their longitudinal axes horizontal, as shown for example in FIG. 5, or in an intermediate position.

Referring now to FIG. 5, part of an electric cell is shown in isometric section having a square stainless steel casing 2 but a round tubular beta-alumina solid electrolyte 3 bounded by a round tubular molybdenum inner casing 52. The inner casing 52 defines an annular gap 24 around the solid electrolyte 2 and an outer reservoir space 53 within the casing 2 for liquid sodium. Liquid sodium is fed to the gap 24 from the reservoir space 53, by four molybdenum capillary tubes 54 disposed to connect to the inner casing 53 on the intersection of the horizontal and vertical axes of the cell as shown in FIG. 5. The tubes 54 are shaped in such a way as to ensure that when the longitudinal axis of the cell is in a horizontal position, irrespective of which of its sides the cell is disposed on, a tube 54 connects to the top of the inner casing 52, and always has its inlet 55 immersed in liquid sodium in the reservoir space 53. In other respects the cell shown in FIG. 5 follows the design principles of the cell shown in FIG. 4.

The example shown in FIG. 2 is also readily applicable with appropriate modifications to electric cells having an inner tubular compartment for sodium, and an outer annular compartment for sulphur disposed about a tubular electrolyte, or alternatively having a solid electrolyte of non-circular configuration such as of flat form in an electric cell of flat form. Alternatively in such cells of tubular form, a reservoir for sodium may be disposed inside the inner tubular compartment to define an annular gap between the casing and the solid electrolyte to perform the same function as the annular gaps 24 shown in FIGS. 1 – 5, feed of sodium from the reservoir to the annular gap being by means of a capillary tube.

Use of the invention provides the safety feature, in that in the event of damage to the solid electrolyte 2, only a relatively limited quantity of liquid anode (that contained in the gap 24) is thereby immediately released to mix with the liquid cathode at a rate above the rate of feed during normal discharge of the cell, and further supply of liquid anode to the liquid cathode is limited to that provided by capillary action. By suitable selection of the capillary device used in the invention a restriction of flow of liquid anode can be imposed such as to permit sufficient flow during normal discharge of the cell but inadequate to allow uncontrolled mixing of the liquid anode and the liquid cathode.

It will be appreciated that in the preceding examples of the invention no capillary action is provided adjacent to the solid electrolyte, thereby avoiding the need for close dimensional control of the solid electrolyte in order to provide a wicking space. Instead capillary action is utilised elsewhere to cause liquid sodium to flow to the top of the liquid anode compartment in order to maintain a level of liquid anode in the compartment.

In order to provide additional protection against corrosive attack from sodium polysulphides, the inside surface of, for example, the casing 2 or the tube 34, may be coated with Nichrome to a depth of about 0.003 inch and then with alumina mixed with 2% titania to a depth of about 0.020 inch. Similarly as an alternative to the use of molybdenum as a barrier means, an alternate material such as stainless steel protected against corrosion as aforesaid may be used.

To provide a secondary protection against gross spillage of liquid anode in the event of damage to the reservoir, a porous foam material such as Nichrome or Torvec ceramic may be disposed in the reservoir.

We claim:

1. An electric cell having a liquid alkali metal anode and a liquid cathode which reacts with said liquid alkali metal anode and comprising,
   a solid electrolyte;
   a liquid anode compartment having a side which is partially bounded by one side of the solid electrolyte, said liquid anode compartment being of very limited capacity so as to contain only a very limited proportion of the liquid anode required by the cell but being incapable of capillary action and being shaped so that the compartment generally follows the contour of the solid electrolyte so as to present a shallow spaced for the liquid anode normal to the surface of the solid electrolyte;
   a liquid cathode compartment which is partially bounded by the other side of the solid electrolyte;
   a reservoir for storing the bulk of the liquid anode;
   barrier means lying between the liquid anode compartment and the reservoir and shaped so as to separate the liquid anode compartment from said reservoir, said barrier means preventing liquid cathode, which might leak into the liquid anode compartment in the event of damage to the solid electrolyte, from reaching the reservoir; and
   a capillary duct, removed from the solid electrolyte and connected between the liquid anode compartment and the reservoir, for providing a restricted feed of liquid anode therethrough, said duct providing feeding of that amount of liquid anode required during normal discharge of the cell but limiting higher rates of feed of liquid anode.

2. An electric cell as claimed in claim 1, wherein the reservoir is disposed outside the cell, and the space between the cell and the reservoir provides the barrier means.

3. An electric cell as claimed in claim 1 and having a current collecting means in the form of a rod of conducting material extending into the liquid cathode compartment, wherein the current collecting means is of hollow form and is closed as its far end in the cell, the reservoir is provided in the space inside the current collecting means which also provides the barrier means, and electrical insulating means are arranged between the current collecting means and the reservoir.

4. A battery of cells as claimed in claim 1, wherein the cells have a single common reservoir to which said cell is connected by the capillary duct thereof.

5. An electric cell as claimed in claim 3, wherein the reservoir comprises a tubular metal container, and the electrical insulating means comprises a ceramic spacer between the container and the current collecting means.

6. An electric cell as claimed in claim 3, wherein an insulating layer of ceramics material on the inside surface of the hollow current collecting means provides the electrical insulating means, and the space inside the current collecting means provides the reservoir.

7. An electric cell having a solid electrolyte which partially bounds on one side a compartment containing liquid sodium and on its opposite side a compartment containing liquid sulphur impregnated in a graphite felt, and a current collecting means extending into the liquid sulphur compartment, wherein the improvement comprises a solid electrolyte of tubular form having a closed end and intended for use with its longitudinal axis vertical and its closed end uppermost, a stainless steel casing of tubular form disposed about the solid electrolyte so as to define the liquid sodium compartment therebetween, the shape of the casing generally following the contour of the solid electrolyte to provide that the liquid sodium compartment is of very limited capacity and presents a shallow space for liquid sodium normal to the surface of the solid electrolyte of the order of $1\frac{1}{2}$ mm, an external reservoir in which the bulk of the sodium required by the cell is arranged to be stored, and a capillary duct connected between the top of the casing and the reservoir so as to provide a restricted feed sodium therebetween, whereby in the event of damage to the solid electrolyte, only a very limited amount of sodium is available in the liquid sodium compartment to react with the sulphur, and further supply of sodium is limited by the capillary duct.

8. A battery of cells as claimed in claim 7, wherever the cells have a single common reservoir to which each said cell is connected by the capillary duct thereof.

* * * * *